United States Patent [19]

Coviello et al.

[11] 4,210,528
[45] Jul. 1, 1980

[54] CLOSED LOOP WASTE TREATMENT AND WATER RECYCLING TOILET SYSTEM

[75] Inventors: Allan J. Coviello, Ann Arbor, Mich.; Frederick E. Bernardin, Wilmington, Del.; Kathryn R. Kalb, Brighton, Mich.

[73] Assignee: Thetford Corporation, Ann Arbor, Mich.

[21] Appl. No.: 16,124

[22] Filed: Feb. 28, 1979

Related U.S. Application Data

[63] Continuation-in-part of Ser. No. 006,619, Jan. 26, 1979, which is a continuation of Ser. No. 850,559, Nov. 11, 1977, abandoned.

[51] Int. Cl.² .............................................. C02C 1/17
[52] U.S. Cl. .......................................... 210/4; 210/16; 210/73 S; 210/220; 210/DIG. 28; 210/195.1
[58] Field of Search .......................................... 210/3–8, 210/11, 63 R, 16–18, 152, 195 R, 195 S, 219, 220, 221 R, DIG. 28, 199, 73 S

[56] References Cited

U.S. PATENT DOCUMENTS

| | | | |
|---|---|---|---|
| 3,607,736 | 9/1971 | Miyaji | 210/11 |
| 3,666,106 | 5/1972 | Green | 210/16 |
| 3,824,632 | 7/1974 | Bach | 210/152 |
| 3,899,423 | 8/1975 | McGrath | 210/152 |
| 3,950,249 | 2/1976 | Eger et al. | 210/152 |
| 3,953,327 | 4/1976 | Parker | 210/7 |
| 3,960,717 | 6/1976 | Wyatt | 210/7 |
| 3,964,998 | 6/1976 | Barnard | 210/7 |
| 3,990,967 | 11/1976 | Hargraves | 210/15 |
| 3,994,802 | 11/1976 | Casey | 210/7 |
| 4,056,465 | 11/1977 | Spector | 210/DIG. 28 |

Primary Examiner—Ernest G. Therkorn
Attorney, Agent, or Firm—Olsen and Stephenson

[57] ABSTRACT

A closed loop waste treatment and water recycling system that includes a delivery system, an anoxic reactor, an aerobic digestion chamber, a filtering system, an adsorption system, a disinfecting system and a water return system. The delivery system includes one or more flush-type toilets and urinals which receive flush water from the water return system and deliver the toilet and urinal waste and flush water to the anoxic reactor. The anoxic reactor contains bacteria which utilizes organics in the toilet waste to convert oxidized nitrogen compounds, such as nitrates, to nitrogen gas, produce bicarbonates and other products. The bacteria, in accomplishing this, lower the organic load on subsequent processes. A denitrified liquid containing bicarbonates and reduced amounts of organics is transferred to the aerobic digestion chamber, which contains biologically active solids and in which organic carbon, organic nitrogen, and ammonium compounds are oxidized by bacteria to obtain a liquid product high in concentration of oxidized nitrogen compounds such as nitrates and low in soluble carbonaceous compounds. This liquid product is filtered, treated with activated carbon, disinfected, and subsequently returned to the toilets and urinals as colorless, clear and odorless flush water containing oxidized nitrogen compounds such as nitrates. The oxidized nitrogen compounds produced in the aerobic digestion chamber insure prevention of odors in the system. As a result of the effective management of nitrogen in the system, it can be made of reasonable size, undesirable odors are avoided and a desired slower buildup of solids in the system is achieved.

8 Claims, 1 Drawing Figure

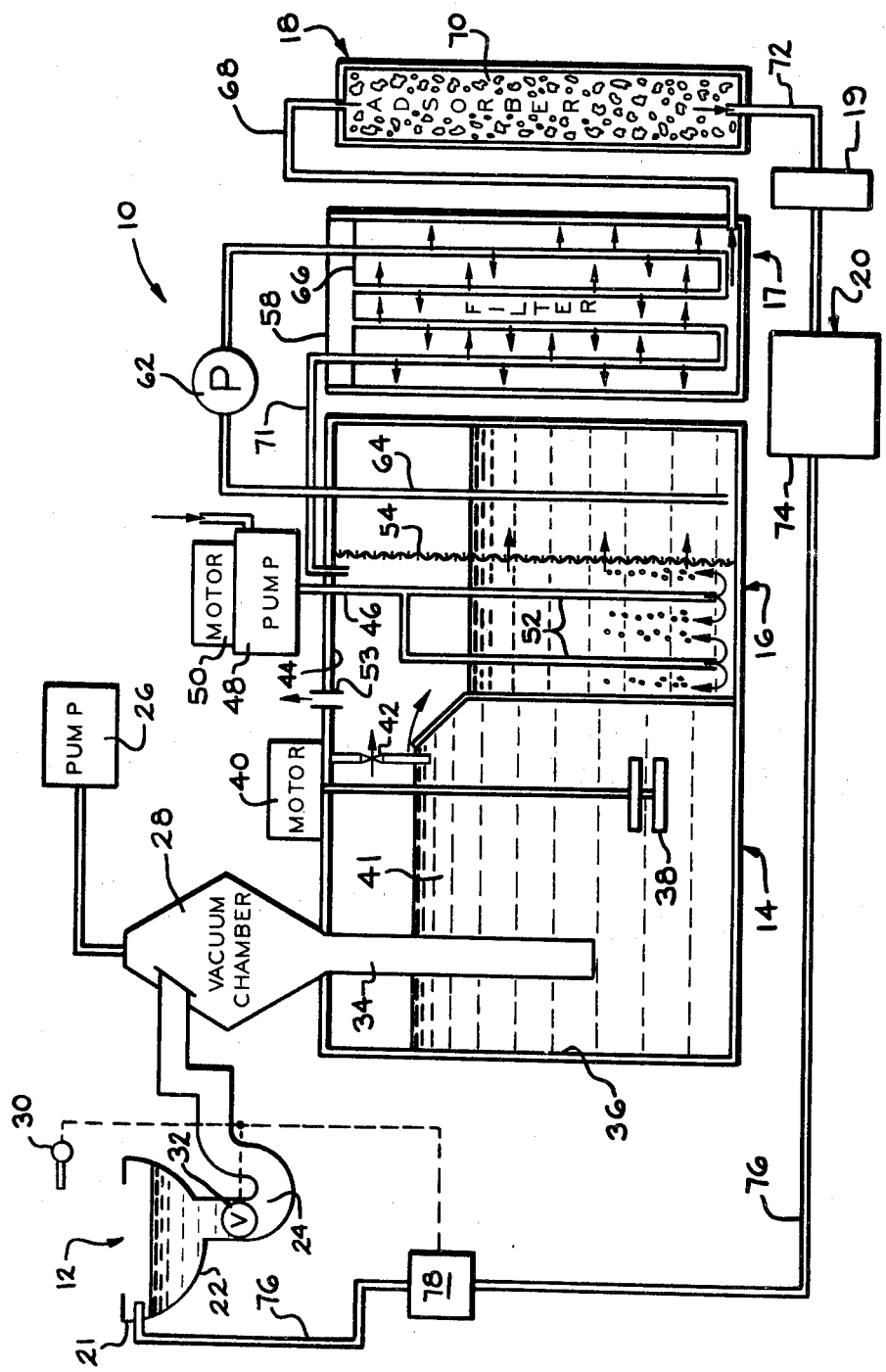

CLOSED LOOP WASTE TREATMENT AND WATER RECYCLING TOILET SYSTEM

REFERENCE TO RELATED APPLICATIONS

This application is a Continuation-in-part of co-pending U.S. patent application Ser. No. 006,619, filed Jan. 26, 1979, which is a continuation of U.S. patent application Ser. No. 850,559, filed Nov. 11, 1977, now abandoned.

BACKGROUND OF THE INVENTION

The present invention relates to improvements in waste treatment and water recycling toilet systems, particularly closed loop systems of the general type shown in U.S. Pat. No. 3,950,249, dated Apr. 13, 1976 and assigned to the assignee of this application. Municipal-type sewage treatment systems, such as shown in U.S. Pat. No. 3,953,327 and 3,964,998, and commonly referred to as "flow through systems" in contrast to "closed loop systems", also have some pertinence to the present invention.

U.S. Pat. No. 3,964,998 shows that it has been known to biologically lower the organic compound concentration in the sewage by treatment of the sewage under anoxic conditions followed by treatment under aerobic conditions. This sequence has been advantageous in that bacteria in the anoxic reactor utilize organics in the sewage to accomplish the breakdown of nitrates, thus requiring no addition of a supplemental organic source into the system. However, such a flow through system requires removal of sludge, thus creating the problem of sludge transport and disposal. Also, in a flow-through system, some of the nitrates resulting from the treatment process flow out of the system and are thus not available for the treatment of organics at the anoxic stage. As a result, the organic load on the aerobic stage is increased, thus requiring a system with a large size aerobic stage.

Closed loop systems in the past have been advantageous in that no external water supply is needed, thus minimizing the unnnecessary usage of potable water. Difficulties have arisen, however, out of deficiencies in the biological processes of these systems. As a result of these deficiencies, inadequate treatment of wastes often resulted in the production of obnoxious odors and colors in the flush water and a rapid accumulation of biological solids in the system.

It is an object of the present invention, therefore, to provide a waste treatment and water recycling toilet system which overcomes the problems of continuous or frequent sludge removal and fresh water influx, while providing effective management of nitrogen in the system so that it can be made of reasonable size, undesirable odors are avoided and a desired slower buildup of solids in the system is achieved.

SUMMARY OF THE INVENTION

The present invention provides sequentially located anoxic and aerobic stations in a closed loop toilet system so that nitrogen-containing compounds are managed in the system to obtain desirable results absent in the prior art.

The toilet waste treatment system of this invention includes a waste delivery system, an anoxic reactor, an aerobic digestion chamber, filtering, adsorption, and disinfection systems and a water return system. The delivery system, as illustrated, includes a single flush-type toilet, but it is to be understood that it can include a plurality of toilets or a number of toilets and a number of urinals and, as a result, the term toilet, as used herein, is inclusive of all of the above. The delivery system also includes means for drawing flush water to the toilet from the water return system, and means for delivering the waste and the flush water to the anoxic reactor. The anoxic reactor contains sludge and agitator means for periodically mixing the contents of the reactor to enhance denitrification of oxidized nitrogen compounds such as nitrates in the mixture.

While the process of biological denitrification is complex and not yet fully understood, it is generally accepted that facultative bacteria which exist in the sludge satisfy their metabolic requirements preferentially through the dissolved oxygen in the liquid. However, if the supply of dissolved oxygen is sufficiently low, "anoxic" conditions are said to exist, and under these conditions, bacteria will reduce oxygen-containing compounds such as nitrates or other oxidized nitrogen compounds. The anoxic reactor in this invention is maintained under these conditions. Bacteria in the reactor utilize toilet waste as the source of organics needed to effect the breakdown of nitrates or other oxidized nitrogen compounds in the reactor to nitrogen gas, and in the process the bacteria substantially lower the amount of organic waste in the reactor and produce bicarbonates. The nitrogen gas produced in this reactor is vented from the system thus reducing the concentration of dissolved solids. Liquid effluent from the anoxic reactor is then transferred to the aerobic digestion chamber.

Effluent from the anoxic reactor is high in concentration of bicarbonates and ammonium compounds and low in concentration of nitrates. It is thus seen that the anoxic reactor is not located in the system to accomplish the breakdown of nitrogeneous compounds in the toilet waste, such as ammonia, but to remove nitrates from the flush water and a substantial quantity of organic material from the toilet waste. In addition, the anoxic reactor produces bicarbonates necessary for the complete oxidation of the ammonium compounds in subsequent processes of the toilet waste treatment system.

The aerobic digestion chamber contains biologically active solids and aeration means to provide sufficient oxygen to effect both the oxidation or organic compounds, and the nitrification of nitrogen compounds in the mixed liquid. Although biological nitrification is also not yet fully understood, it has been found that under conditions of sufficient oxygen, nitrifying bacteria in the biologically active solids are able to oxidize ammonium compounds and convert these compounds to nitrates. The aerobic digestion chamber of the present invention is maintained under these conditions so that the bacteria utilize the bicarbonates in the mixed liquid as the necessary carbon source to accomplish the desired nitrification. Effluent from the aerobic digestion chamber is thus low in ammonium and carbonaceous compounds and high in nitrates.

As used herein, the expression "biologically active solids" includes bacteria in both suspended growth form and in attached growth form. In the suspended growth reactor, the bacteria is in suspension in a material commonly called "activated sludge" and in the attached growth reactor the bacteria are attached to solid bodies. Thus while the invention is particularly described with respect to the use of activated sludge in the aerobic digestion chamber, it is to be understood that it is within the purview of this invention to use bacteria in the attached mode in the aerobic digestion chamber.

Screened liquid is removed from the aerobic digestion chamber and passed directly, under pressure, to the filters which remove suspended solids, colloidal matter and large amounts of bacteria from the liquid. Filtrate is then transferred to adsorption means which includes a bed of activated carbon. The internal pore structure of activated carbon and the affinity of activated carbon for organic matter provide for the removal of undesirable color and odor from the liquid. Liquid is disinfected and then transferred to a water storage tank from which, on demand from the delivery actuator, it is delivered to the toilet, thus completing the closed loop cycle.

Due to the closed loop arrangement of the present invention, nitrates produced in the aerobic digestion chamber are present throughout the filtering, adsorption, disinfecting and water return and delivery systems. The presence of nitrates in the liquid in the filtering and adsorption systems prevents the reduction of sulfates which may also be present in the liquid. The reduction of sulfates would otherwise cause the production of hydrogen sulfide which has a readily recognizable obnoxious odor. Nitrates are still present in the liquid as it is delivered with toilet waste into the anoxic chamber, thus inducing greater biological destruction of organic wastes and increased production of bicarbonates for use in the aerobic digestion chamber. The management of nitrates in the present system thus allows for prevention of hydrogen sulfide or other obnoxious odors, efficient biological treatment of toilet waste and corresponding reduction in the requirements for aerobic digestion chamber size.

The present invention also provides indefinite retention of sludge solids. This insures sufficient microorganism age to accomplish the desired results in the biological treatment processes. In the system of this invention, the amount of biologically active solids in the aerobic chamber and the amount of organic material supplied from the anoxic reactor are balanced such that minimum sludge accumulation rates and maximum nitrification rates are achieved in the aerobic chamber. Elimination of excess sludge production and the need for disposal thereof prevents the potential pollution of external surface and subsoil water supplies. Also, the recycle and reuse of water prevents the unnecessary usage and pollution of water supplies.

Further objects, features and advantages of this invention will become apparent from a consideration of the following description, the appended claims and the accompanying drawing, which is a diagrammatic view of the system of the present invention.

DESCRIPTION OF THE PRESENT INVENTION

The closed loop waste treatment and water recycling toilet system of this invention, indicated generally at 10 in the drawing, comprises a waste delivery system 12, an anoxic reactor 14, an aerobic digestion station 16, a filtering system 17, an adsorption system 18, a disinfecting system 19, and a water return system 20. The delivery system 12 includes a toilet 21 having a waste deposit bowl 22 and an outlet passage 24. The system 12 also includes a vacuum pump 26, a vacuum chamber 28, and a demand actuator 30 operatively associated with a toilet valve 32 located in the passage 24. In response to manual operation of the actuator 30, the valve 32 is opened allowing the contents of the bowl 22 to be drawn by means of the pump 26 through the passage 24 and into the vacuum chamber 28. The vacuum chamber 28 operates to break up solid particles in the toilet waste, and contains a discharge conduit 34 through which the broken up toilet solids and flush water are transferred to the anoxic reactor 14.

The anoxic reactor 14 has sludge containing bacteria in it and is located in the system 10 to provide partial biological treatment of influent toilet waste and denitrification of nitrates contained in the influent. The reactor 14 includes a treatment chamber 36 and an agitator 38 driven by a motor 40. The motor 40 is operated intermittently to provide for the intimate physical contact of toilet waste, flush water and bacteria in the anoxic sludge. Bacteria in the reactor utilize toilet waste as the source of organics needed to effect the breakdown of nitrates to nitrogen gas and produce bicarbonates and in the process the bacteria substantially lower the amount of organic waste in the reactor. When the motor 40 is off, the solid matter settles in chamber 36. The chamber 36 is maintained under low oxygen conditions, (not in excess of 0.5 mg/l, and ideally zero, dissolved oxygen), in which the primary compound being reduced by bacteria in the anoxic sludge is nitrate; such conditions being known as anoxic conditions. The compounds produced in the treatment chamber 36 under these conditions include nitrogen gas and bicarbonates, according to the following reaction wherein the organic waste is represented by methanol:

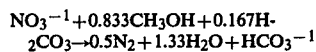

$$NO_3^{-1} + 0.833CH_3OH + 0.167H_2CO_3 \rightarrow 0.5N_2 + 1.33H_2O + HCO_3^{-1}$$

Gases are released from the chamber 36 through a conventional one-way vent valve 42. The one-way valve 42 prevents the entry of oxygen into chamber 36 and thereby maintains a low concentration of dissolved oxygen in the partially treated mixture 41 in the chamber 36. Introduction of influent to the chamber 36 causes wash-over of partially treated liquid 41 from the chamber 36 to the aerobic digestion station 16 so as to control the fluid level in the chamber 36.

The aerobic digestion station 16 is located in the system 10 downstream from and adjacent to the reactor 14 to provide for the biological treatment of denitrified effluent from the anoxic reactor 14 and the nitrification of ammonium compounds in the effluent to produce nitrates. The aerobic station 16 comprises a treatment chamber 44 containing biologically active solids in the suspended growth mode and aeration means 46 which includes a pump 48 driven by a motor 50 operable to deliver air through conduits 52 to denitrified liquid in the chamber 44. The aeration means 46 agitates the material in chamber 44 and provides for mixing of the denitrified liquid and activated sludge contained in the chamber 44, and also provides an oxygen source for bacteria in the activated sludge to accomplish the nitrification process. The bacteria use bicarbonates in the liquid as the carbon source necessary to effect the oxidation of nitrogeneous compounds, such as ammonia, to produce nitrates, according to the following reaction:

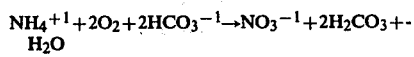

$$NH_4^{+1} + 2O_2 + 2HCO_3^{-1} \rightarrow NO_3^{-1} + 2H_2CO_3 + H_2O$$

In the process, additional organic matter in the waste is digested in the chamber 44. The amount of air admitted to the treatment chamber 44 is preferably controlled by conventional control means to provide for evaporation of liquid through a vent 53 sufficient to maintain desired fluid levels throughout the system 10. The dissolved oxygen concentration in the aerobic chamber should be maintained at least above 2 mg/l and should ideally be above 4 mg/l to attain maximum nitrification. To accomplish this, along with adequate agitation and the desired evaporation to maintain liquid levels in the chambers, it is preferable that air be admitted through the chamber, in the form of small bubbles, at a rate of at least 30,000 cubic feet per pound of BOD (biochemical oxygen demand) being loaded on the aerobic chamber. Particularly where mixing is accomplished otherwise and where substantial evaporation is not required, lower aeration rates can be used to accomplish the desired dissolved oxygen concentration.

Treated liquid in the chamber 44 passes through a screen 54 for flow through a pipe 64 into the filtering system 17. The filtering system 17 provides means for separating solids, sludge, organic matter and bacteria from biologically treated liquid and passing a clarified effluent on to the adsorption system 18. In the system 17, liquid is drawn from the aerobic chamber 44 by means of a pump 62 through the conduit 64 and is introduced under pressure to tubular filter membrane 66. These filter membranes are preferably of submicron pore size to provide ultrafiltration and substantially complete filtration of bacteria and colloidal particles of a size greater than 0.5 microns from the liquid. The filtrate should ideally not contain in excess of 5 mg/l of BOD. This best assures there will be no significant denitrification of the filtrate prior to its entrance to the axonic chamber as the flush water. The rate of flow of liquid to the filtering system 17 is purposely made substantially greater than the filtering capacity of the filters 66. As a result, some of the liquid does not pass through the filters but instead washes over the surfaces of the filters thus cleaning these surfaces and then returns through the line 71 to the aerobic chamber 44.

It should be noted that the product of the aerobic station is transferred directly to the filtering station. That is, there is no sedimentation step, there is no sedimentation chamber, between the aerobic station and the filtering station. This would appear to be disadvantageous in that with the elimination of sedimentation prior to filtration, a heavier load is placed on the filtering station since without sedimentation there is little if any settling of solids from the liquid prior to filtration, to the end that the liquid transferred to the filtering station contains more solids than would be the case where there is prior sedimentation, thereby increasing the load on the filtering station in its function of removing solids from the liquid. But no matter this transfer of the product of the aerobic station directly to the filtering station may increase the load on the filtering station, it is, in the overall, highly advantageous and of importance to the method and system in that it maximizes the nitrate concentration of the filtered water cycled back to the toilet station for use as flush water. That is, because there is high nitrate concentration in the flush water there is optimum efficiency in the anoxic chamber where denitrification occurs with its attendant bacterial disintegration of the waste solids into liquid and gas. In short, high nitrate concentration is desirable in the flush water-waste mixture flowing into the anoxic chamber in order to facilitate and optimize the anoxic chamber's function——and in the system of the present invention the high nitrate concentration is obtained within the closed loop itself. That is, it is in the aerobic chamber where the nitrification occurs by way of the flow of air through the liquid in that chamber—which flow of air also stirs or agitates the mix. Hence it is in the aerobic station that nitrate concentration is highest and by transferring the product of the aerobic station directly to the filtering station, rather than by way of an intermediate sedimentation step, the highest possible nitrate concentration in the filtrate from the filtering station is attained. This is because sedimentation requires that there be quiescence, and therefore no flow of air. When the product of the aerobic station, containing bacteria as it does, sits in a state of quiescence, at least some denitrification occurs and hence a reduction in nitrate concentration. So it is that by the elimination of sedimentation—by transferring directly from the aerobic station to the filtering station—the method and system of the present invention provides a high nitrate concentration in the flush water cycled from the filtering station. The added load on the filters is attended to by transferring the liquid from the aerobic station to the filtering station at a rate greater than the capacity of the filters whereby there is a washing action on the surfaces of the filters.

Filtered liquid passes through a conduit 68 to a bed of activated carbon 70 in the adsorption system 18. The internal pore structure of the activated carbon 70 in the adsorption system 18, and the affinity of this activated carbon for organic matter provide for the removal of undesirable color and odor from the filtered liquid.

Colorless, odorless liquid from the adsorption system 18 is then transferred through a conduit 72 to a disinfection system 19 which is a conventional structure, such as the unit shown in U.S. Pat. No. 3,551,091. From system 19 the disinfected liquid, still containing the nitrates, flows to the water return system 20. The water return system 20 includes a storage tank 74 and a conduit 76 communicating with the toilet bowl 22. A valve-pump unit 78 operatively associated with the demand actuator 30 is located in the conduit 76. In response to activation of the actuator 30, the unit 78 is opened and disinfected liquid is pumped through the conduit 76 and delivered to the bowl 22 for use as flush water.

In the operation of the system 10, assume that human waste has been deposited in the toilet bowl 22. The actuator 30 is then activated causing an influent high in concentration of nitrogenous compounds from the waste, such as urea, and high in nitrates from the flush water, to be delivered from the bowl 22 to the anoxic reactor 14 to be treated biologically therein as described above. Effluent from the anoxic reactor 14 is high in concentration of bicarbonates and ammonium compounds and low in nitrates. The effluent is further treated in the aerobic digestion station 16 to produce a mixed liquid low in concentration of carbonaceous and ammonium compounds and high in nitrates. Liquid containing nitrates is passed through the filtering system 17 where solids, sludges and bacteria are separated and returned to the aerobic digestion station 16. Filtrate high in concentration of nitrates is gathered from the filtering system 17 and passes through the adsorption system 18 for removal of color and odor and on to a water return system 20 from which clarified liquid high in concentration of nitrates is transferred to the delivery system 12 for use as flush water. With the method and system of the present invention, used for treatment of human waste, the nitrate nitrogen concentration in the filtrate, i.e. the recycled flush water, exceeds 50 mg/l and concentrations of nitrate nitrogen in excess of 200 mg/l are typical.

It is thus seen that all of the treated water and the nitrates contained therein, produced in the aerobic chamber, are returned to the anoxic reactor in the flush water by virtue of the closed loop characteristic of the invention. Nitrates delivered with flush water into the anoxic reactor 14 enhance the digestion of organics in the waste therein to decrease the organic loading on the aerobic digestion station 16 and further aid in the production of bicarbonates for use in the nitrification process in the aerobic station 16. Typically, the BOD reduction in the anoxic reactor ranges from about 40% to 75%, thereby assuring that nitrification will be optimized in the aerobic chamber. The end result is a great reduction in sludge formation thereby eliminating the need for frequent sludge removal from the chambers. Nitrates produced in liquid in the aerobic station 16 prevent the reduction of sulfates and subsequent production of hydrogen sulfide. It is to be understood that while the system 10 has been particularly described with regard to the production of nitrates in the aerobic station 16 and the beneficial use of these nitrates in the anoxic reactor, and while ideally all of the oxidized nitrogen compounds generated during the nitrification will be nitrates, which is the highest state of oxidation of nitrogen, nevertheless some of the nitrogen compounds resulting from the nitrification may be in a lower state of oxidation, e.g. with a +3 valence, all such compounds being within the intended meaning of the term "oxidized nitrogen compounds."

It is also seen that biological activity in the chamber 16 insures degradation of solids not completely reduced in the anoxic reactor 14 and further insures that rapid accumulation of biological solids in the chamber 16 is prevented. The treatment system thus provides, as a result of the managed use of nitrogen in the system, a method and apparatus for effectively treating toilet waste and re-using flush water while retaining compactness.

What is claimed is:

1. In a multi-stage method for treating toilet waste and recycling treated liquid therefrom, the steps of:
   a. receiving said waste at a first stage and flushing said waste from said first stage with flush water containing nitrates thereby to form a liquid mixture of the waste and nitrate-containing flush water,
   b. transferring said liquid mixture to a second stage whereby said mixture is agitated and is maintained under anoxic conditions so as to cause denitrification of said liquid mixture and generation of nitrogen gas, said nitrogen gas being vented from said second stage in such manner as to prevent the entry of oxygen into said second stage thereby to assist in maintaining the anoxic conditions in said second stage,
   c. transferring liquid from said second stage to a third stage containing biologically active solids and liquid and being maintained under aerobic conditions, air being passed through the mixture in said third stage at a sufficient rate to cause nitrification of nitrogenous compounds in said mixture, thereby to produce nitrates therein, the dissolved oxygen in the mixture in said third stage being greater than 2 mg/l,
   d. transferring the nitrate-containing mixture from said third stage directly to a filtering stage wherein said mixture is filtered to separate nitrate-containing water therein from the solids therein, the concentration of nitrate nitrogen in said nitrate-containing water being at least 50 mg/l,
   e. cycling solids from said filtering stage back to said third stage; and
   f. cycling said nitrate-containing water from said filtering stage to said first stage thereby to serve as said nitrate-containing flush water in said first stage.

2. A method according to claim 1 in which the nitrate-containing water separated from the solids in said filtering stage is passed through a bed of activated carbon and is thereafter disinfected before being cycled to said first stage.

3. A method according to claim 1 in which the air is passed through said mixture in said third stage at a sufficient rate to accomplish evaporation of some of the liquid in the third stage to maintain a constant fluid level.

4. A method according to claim 1 in which the rate of input of said air into said third stage is at least about 30,000 cubic feet per pound of BOD loaded on said third stage.

5. A method according to claim 1 in which all of said nitrate-containing water from said filtering stage is cycled to said first stage.

6. A method according to claim 1 in which the agitation of said mixture in said second stage is periodic.

7. A waste treatment and water recycling toilet system comprising:
   a. a toilet station comprising a waste receiving toilet, means for admitting nitrate-containing water to said toilet to flush the waste from the toilet and form a mixture of said waste and said nitrate-containing water,
   b. means for transferring said mixture to an anoxic station,
   c. said anoxic station comprising a chamber containing sludge, means for mixing said sludge with said mixture of waste and nitrate-containing water and means for maintaining said chamber under anoxic conditions so as to cause denitrification of the mixture in said chamber thereby to produce nitrogen gas, and including a one-way valve for venting nitrogen from said chamber while preventing the entrance of oxygen into said chamber,
   d. means for transferring liquid from said chamber to an aerobic station,
   e. said aerobic station comprising an aerobic chamber containing biologically active solids which form a mixture with the liquid from said anoxic station, and further including aeration means supplying air to the mixture in said aerobic chamber to agitate the mixture in said aerobic chamber and to induce nitrification of nitrogenous compounds in said aerobic chamber thereby to generate nitrates in the mixture in said aerobic chamber, said mixture within the aerobic dhamber having a concentration of dissolved oxygen greater than 2 mg/l and a nitrate nitrogen concentration of at least 50 mg/l,
   f. means for transferring the mixture from said aerobic chamber directly to a filtering station,
   g. said filtering station comprising a filter for separating nitrate-containing water from solids in the mixture received by said filtering station from said aerobic chamber,
   h. means for transferring the nitrate-containing water from said filtering station to a purification station, i. said purification station including means for circulating said nitrate-containing water through an absorbent material for removal of odor and color therefrom, and
j. means for cycling the nitrate-containing water from said purification station to said toilet station for use of said nitrate-containing water as the flush water in said toilet station.

8. The system according to claim 7 in which the means for transferring the mixture from said aerobic chamber to said filtering station transfers said mixture at a rate of flow substantially greater than the filtering capacity of the filter means whereby some of the mixture washes over the surfaces of the filter means thereby cleaning said surfaces.

* * * * *